US012705452B2

(12) United States Patent
Balgañón Canela et al.

(10) Patent No.: US 12,705,452 B2
(45) Date of Patent: Aug. 11, 2026

(54) AUTHENTICATION SYSTEM FOR CONSUMER PRODUCTS

(71) Applicant: PACKAGING INNOVATION, S. DE R.L., Panamá (PA)

(72) Inventors: Pedro Balgañón Canela, Barcelona (ES); Carlos Mendoza, Mérida (MX)

(73) Assignee: PACKAGING INNOVATION, S. DE R.L., Panamá (PA)

( * ) Notice: Subject to any disclaimer, the term of this patent is extended or adjusted under 35 U.S.C. 154(b) by 0 days.

(21) Appl. No.: 19/054,085

(22) Filed: Feb. 14, 2025

(65) Prior Publication Data

US 2025/0190737 A1 Jun. 12, 2025

Related U.S. Application Data

(63) Continuation-in-part of application No. 18/627,254, filed on Apr. 4, 2024, now Pat. No. 12,493,768, which is a continuation-in-part of application No. 17/857,683, filed on Jul. 5, 2022, now Pat. No. 12,361,251, which is a continuation-in-part of application No. 17/350,606, filed on Jun. 17, 2021, now Pat. No. 12,321,799, which is a continuation-in-part of application No. 17/182,308, filed on Feb. 23, 2021, now Pat. No. 11,694,051, which is a continuation of application No. (Continued)

(51) Int. Cl.

| | |
|---|---|
| ***G06K 19/07*** | (2006.01) |
| ***A24F 15/08*** | (2006.01) |
| ***B65D 85/12*** | (2006.01) |
| ***G06Q 30/0226*** | (2023.01) |
| ***H04W 4/38*** | (2018.01) |
| ***H04W 4/80*** | (2018.01) |
| ***H04W 12/50*** | (2021.01) |

(52) U.S. Cl.

CPC .......... *G06K 19/0723* (2013.01); *A24F 15/08* (2013.01); *B65D 85/12* (2013.01); *G06Q 30/0226* (2013.01); *H04W 4/38* (2018.02); *H04W 4/80* (2018.02); *H04W 12/50* (2021.01)

(58) Field of Classification Search

CPC ...... G06K 19/0723; H04W 4/38; H04W 4/80; H04W 12/50

USPC .......................................................... 235/492

See application file for complete search history.

(56) References Cited

U.S. PATENT DOCUMENTS

| | | |
|---|---|---|
| 6,996,543 B1 | 2/2006 | Coppersmith et al. |
| 9,076,024 B2 | 7/2015 | Corby |

(Continued)

*Primary Examiner* — Allyson N Trail

(74) *Attorney, Agent, or Firm* — Mark Terry

(57) ABSTRACT

A method for authenticating a consumer product includes coupling a near field communication (NFC) tag to a consumer product, wherein said NFC tag includes a printed representation of a unique product code (UPC), coupling a physical element to the consumer product wherein the physical element includes a visible printed representation of the UPC, executing an application on a computing device for reading an identifier from the NFC tag, transmitting it to a server, and displaying a UPC received from the server, such that a user may determine if the UPC that was received matches the printed representation of the UPC, and wherein the server is configured for receiving the identifier and transmitting the UPC associated with the identifier in a database record.

7 Claims, 6 Drawing Sheets

Related U.S. Application Data

17/088,687, filed on Nov. 4, 2020, now Pat. No. 10,929,738.

(60) Provisional application No. 63/018,577, filed on May 1, 2020.

(56) References Cited

U.S. PATENT DOCUMENTS 9,734,505 B2 8/2017 Benoit et al.
10,789,601 B2 9/2020 Pacotto et al.
11,416,725 B1* 8/2022 Henrichon, Jr. ..... G06K 7/1417
11,423,274 B2 8/2022 Van Garsse
2008/0106372 A1 5/2008 Chang
2008/0140432 A1 6/2008 Fenn
2010/0306085 A1 12/2010 Schmidt et al.
2013/0169409 A1 7/2013 Chang et al.
2014/0279246 A1* 9/2014 Chen .................. G06F 16/9538 705/26.61
2015/0363990 A1* 12/2015 Truong .................. G07D 7/12 382/136
2016/0318325 A1* 11/2016 Klein .................... C09D 11/50
2016/0328639 A1* 11/2016 Cohn .............. G06K 19/07771
2017/0032382 A1 2/2017 Shulman et al.
2017/0046707 A1* 2/2017 Krause .................... G07G 1/14
2017/0154343 A1 6/2017 Kozlowski et al.
2017/0193429 A1* 7/2017 Olson ................. G06Q 10/087
2020/0050813 A1* 2/2020 Bonner .................. G06F 9/542
2020/0151738 A1 5/2020 Guinard et al.
2020/0265446 A1* 8/2020 Vargas .................. G06Q 10/08
2021/0217028 A1 7/2021 Casucci
2021/0374497 A1 12/2021 Syed
2022/0076277 A1 3/2022 Elling-Andersen et al.
2022/0172224 A1 6/2022 Quisling
2022/0398601 A1 12/2022 Anastas et al.
2023/0031817 A1 2/2023 Mulas et al.
2023/0147221 A1* 5/2023 Fileccia .......... G06K 19/06037 340/572.1
2023/0368216 A1* 11/2023 Hagen ............... G06Q 30/0185
2024/0152863 A1* 5/2024 Zhang ................. G06V 30/148
2024/0289833 A1 8/2024 Faris et al.
2025/0061411 A1* 2/2025 Llanes ................ G06K 7/1417
2025/0182163 A1* 6/2025 Publicover ........... H04L 67/306

* cited by examiner

AUTHENTICATION SYSTEM FOR CONSUMER PRODUCTS

CROSS-REFERENCE TO RELATED APPLICATIONS

This patent application is a continuation in part of, and claims priority to, patent application Ser. No. 18/627,254 filed Apr. 4, 2024, which is a continuation in part of, and claims priority to, patent application Ser. No. 17/857,683 filed Jul. 5, 2022, which is a continuation in part of, and claims priority to, patent application Ser. No. 17/350,606 filed Jun. 17, 2021, which is a continuation in part of, and claims priority to, patent application Ser. No. 17/182,308 filed Feb. 23, 2021, which is a continuation of, and claims priority to, patent application Ser. No. 17/088,687 filed Nov. 4, 2020, which claims priority to provisional patent application 63/018,577 filed May 1, 2020. The subject matter of patent application Ser. Nos. 18/627,254, 17/857,683, 17/350,606, 17/182,308, 17/088,687 and 63/018,577 are hereby incorporated by reference in their entirety.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The claimed embodiments relate to the field of product authentication and anti-counterfeiting technologies and more specifically to leveraging near-field communication (NFC) technology to ensure product authenticity, track inventory, and prevent counterfeiting.

BACKGROUND

In the field of product authentication and anti-counterfeiting, various technologies have been developed to protect products from tampering, counterfeiting, and unauthorized distribution. These technologies commonly include physical security features, such as holograms, tamper-evident seals, barcodes, and serialized numbers, as well as digital solutions, including RFID (Radio-Frequency Identification) and NFC (Near-Field Communication) tags. NFC technology has gained significant attention due to its ability to provide both physical and digital verification. NFC tags can store unique identifiers that are readable by mobile devices or specialized hardware, offering a convenient method for verifying product authenticity. Many systems also rely on centralized databases to link NFC tags to specific product details. Despite these advancements, significant drawbacks remain in the current state of the art.

One issue lies in the limited integration between physical security features and digital authentication methods. Current systems often fail to seamlessly combine these two approaches, leaving opportunities for counterfeiters to exploit one system independently of the other. Furthermore, many NFC-based authentication systems rely on static data stored on the tags. Once compromised, these static codes can be easily duplicated or manipulated by counterfeiters, which undermines the effectiveness of the system. Products that consist of multiple components, such as luxury packaging containing individual items, present additional challenges. These systems often lack the ability to authenticate and associate the individual components with the primary product in a unified verification process, leaving the components vulnerable to tampering or substitution.

Another drawback of existing technologies is the limited traceability they provide. Current systems often struggle to track and trace products throughout the supply chain, which makes it difficult to detect and address problems such as diversion, parallel markets, or unauthorized resale. Consumer engagement is also inadequately addressed by most existing systems. While NFC technology allows for a basic level of authentication, it rarely provides meaningful digital experiences for consumers, diminishing the perceived value of the product and its associated security features. Additionally, many systems lack the ability to manage inventory in real time during the authentication process, resulting in inefficiencies and limited visibility into the status of processed and unprocessed products.

Therefore, there exists a need for improved systems that address the shortcomings of existing technologies, particularly for a more robust and efficient product security system that provides more engaging consumer-facing solutions.

SUMMARY

A method for authenticating a consumer product is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claim subject matter's scope.

A method for authenticating a consumer product is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claim subject matter's scope.

In one embodiment, the method for authenticating a consumer product, includes coupling a near field communication (NFC) tag to a consumer product wherein said NFC tag is programmed to provide a unique identifier (UID) to a mobile computing device when said NFC tag is scanned, and wherein said NFC tag includes a printed representation of a unique product code (UPC), coupling a physical element to the consumer product wherein said physical element includes a visible printed representation of the UPC, storing in a database, communicatively coupled to a communications network, a record for each of a plurality of consumer products, wherein each record includes at least a UPC and an associated UID, executing an application on a computing device communicatively coupled to the communications network, wherein said application is configured for reading the UID from the NFC tag, transmitting the UID to a server via the communications network, and displaying a UPC received from the server, such that a user may determine if the UPC that was received matches the printed representation of the UPC, and wherein the server is configured for receiving the UID, via the communications network, from the application, accessing a record in the database that corresponds to the UID and reading a UPC from the record, and, transmitting, via the communications network, the UPC associated with the UID in the record.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
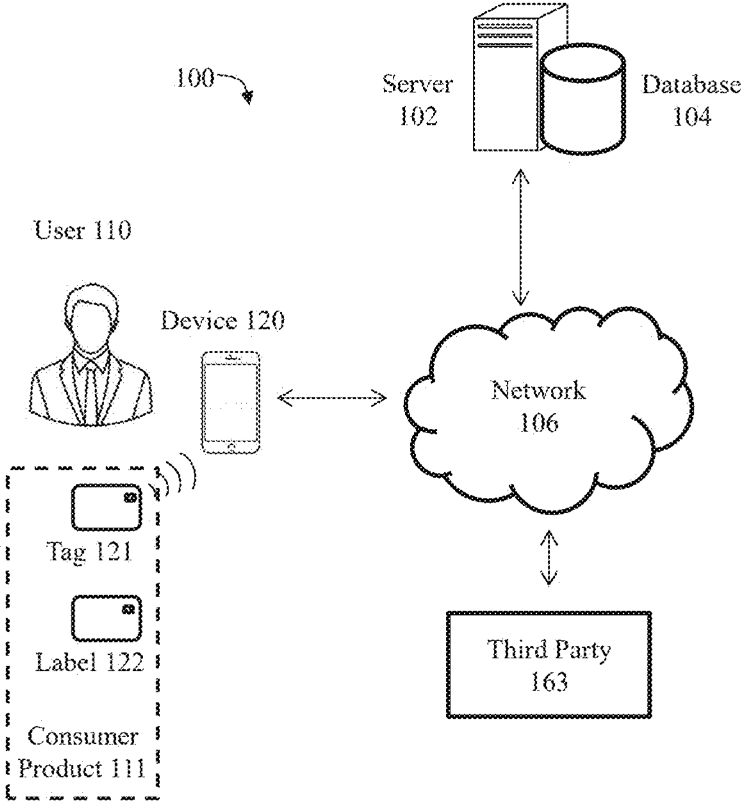
FIG. 1 is a block diagram of an operating environment that supports a process for authentication of consumer products, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed embodiments of the NFC security system represent a significant advancement over the prior art by addressing several critical shortcomings in existing product authentication and anti-counterfeiting technologies. Current systems often suffer from limited integration between physical and digital security measures, relying either on static physical features or standalone digital identifiers. The claimed system resolves this issue by combining tamper-resistant physical elements, such as printed microtext and high-quality logos, with dynamic digital authentication using NFC tags and a secure database. This dual-layer approach ensures that both physical and digital elements are tied together, making it far more challenging for counterfeiters to exploit one aspect of the system independently.

The claimed embodiments use NFC tags that are initially inactive and require activation during a controlled process, such as inventory or quality checks. This feature mitigates the vulnerability of static tag data, a common drawback in the prior art, where counterfeiters can replicate or misuse tags with preprogrammed identifiers. By requiring tag activation, the claimed system ensures that only authorized tags that have passed through legitimate processes can be authenticated. Furthermore, the activation process links the NFC tag's unique identifier (UID) with a unique product code (UPC) in the database, creating a dynamic and verifiable association that enhances security.

The claimed embodiments also address challenges related to multi-level authentication for products comprising multiple components, such as packaging and its contents. By enabling the simultaneous association of a packaging UID with the UIDs of individual items it contains, the system provides a comprehensive verification mechanism that ensures the integrity of the entire product package. This prevents tampering or substitution of individual components, an issue that existing systems often fail to address. Moreover, the centralized database tracks these associations and provides real-time traceability, enabling better detection of diversion or unauthorized resale in parallel markets.

FIG. 1 is a block diagram of an operating environment 100 that supports a method and system for authentication of consumer products on a server communicatively coupled with a communications network 106. The server 102 and devices 120, 163 may be communicatively coupled with a communications network 106, according to an example embodiment. The environment 100 may comprise computing devices 120, 163 which may communicate with server 102 via a communications network 106. Said computing devices may be mobile computing devices. Mobile computing devices may comprise a cellular/mobile telephone, smart phone, tablet computer, laptop computer, handheld computer, desktop computer, wearable computer, or the like. The mobile computing devices may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

FIG. 1 also shows an identification device or tag 121 placed on, in, or around consumer product 111. Tag 121 may be a near field communication (NFC) tag that emits radio frequency signals that comport with the ISO/IEC 18092 and ECMA 340 communications protocol standards. Tag 121 may also include encryption and authentication standards such as those described in ISO/IEC 18000, 29167 and ISO/IEC 20248. The tag 121 may also store additional data about a consumer product, such as any of the data in the consumer product's record, described in further detail below. In general, the tag 121 may be any radio frequency device that is configured to transmit a radio frequency signal that is readable over short distances. The tag 121 may also be configured for attachment to product packaging in such a way that the tag is able to detect if the product packaging has been opened. For example, one or more conductive terminals may be disposed on the surface of the tag and the surface of the tag may be applied (such as by adhesive) to the product packaging along a rip line or other line in which the product must be opened. When the product packaging is opened, the one or more conductive terminals are no longer conductively coupled, which may be detected by the tag.

FIG. 1 also shows a label 122 placed on, in, or around consumer product 111. Label 122 may be attached to the product using an adhesive and may include a product logo, a serial number, a unique product code, a unique identifier, etc. The tag 122 may also be and be manufactured from metal, plastic, ceramic, etc. In one embodiment, tag 121 and/or label 122 is placed on, in, or around the product 111.

The environment 100 shows that device 120 is operated by a user 110, which may be a person, a retailer, a manufacturer, an importer, an exporter, a transporter, a government worker, a distributor, a border security worker, a tax worker, an end-user of the consumer product 111, an intermediate user of the consumer product, or the like. Server 102, tag 121 and devices 120, 163 may each comprise a computing device 600, described below in greater detail with respect to FIG. 6.

Computing device 102 includes a software engine that delivers applications, data, program code and other information to networked devices, such as device 120. The software engine of device 102 may perform other processes such as transferring multimedia data in a stream of packets that are interpreted and rendered by a software application as the packets arrive. FIG. 1 further shows that device 102 includes a database or repository 104, which may be a relational database comprising a Structured Query Language (SQL) database stored in a SQL server. Mobile computing device 120 may also include its own database, either locally or via the cloud. The database 104 may serve related information from a product's corresponding product record (located in database 104), which may be used by devices 102 and 163.

Device 102, mobile computing device 120, 163 and tag 121 may each include program logic comprising computer source code, scripting language code or interpreted language code that perform various functions of the disclosed embodiments. In one embodiment, the aforementioned program logic may comprise program module 606 in FIG. 6. It should be noted that although FIG. 1 shows only one mobile computing device 120, one tag 121, one label 122 and one server 102, the system of the disclosed embodiments supports any number of servers, tags, labels, and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

The database 104 may include a consumer product record for each individual consumer product 111. A consumer product record may include: the consumer product name, a consumer product identifier (which may be unique), a unique identifier (UID), information about the authenticity of the consumer product, consumer product packaging information, instructions for use related to the consumer product, warranty information, interactive content, information regarding integration with social networks, redirect links to the vendor or manufacturer's website, etc. A consumer product record may further include a unique product code, such as a UPC code or a QR code, corresponding to the consumer product. A consumer product record may further include a URL containing an encrypted packet that uniquely identifies said NFC tag.

A unique identifier is a hardware-based identifier embedded within each NFC tag during its manufacturing process. Unlike the UPC, the UID is immutable and cannot be altered, serving as a secure, device-specific marker. The UID establishes a reliable link between the NFC tag and the corresponding record in the database. When an NFC tag is scanned using a mobile computing device, the UID is read and transmitted to a server via a communications network. The server uses the UID to access the product's record in the database, retrieving the associated UPC. By keeping the UID permanently tied to the NFC tag, the system ensures that only authentic tags can be used in the authentication process, further preventing counterfeit attempts.

The unique product code (UPC) is a distinct alphanumeric string assigned to each consumer product in the system. This code is generated algorithmically to ensure non-consecutive sequences and prevent predictability. The UPC serves as the primary identifier for the product in the authentication process and is included as part of the printed elements on the NFC tag for physical verification. It typically consists of product-specific identifiers and may include control digits calculated using checksum algorithms to add an additional layer of security. The UPC is associated with the unique identifier (UID) of the NFC tag and stored in a secure database. During authentication, the UPC is retrieved from the database and displayed to the user, allowing for verification against the printed UPC on the NFC tag. This ensures that the product's physical and digital identities align, making it more difficult for counterfeiters to replicate or tamper with the product.

The UPC is algorithmically generated to ensure that it is not correlative, thereby increasing the difficulty of reverse engineering or replication by counterfeiters. This code may be a 7-character alphanumeric string comprising two letters and five numbers. One letter may correspond to a specific product reference, which identifies the product type. Another letter may be a check digit, generated through a mathematical algorithm using the five numerical digits in the code. This check digit varies for each product container, further enhancing the system's robustness and resistance to counterfeiting. A check digit is a single numerical or alphanumeric character added to the end (or occasionally the beginning) of a sequence of numbers or letters to help verify the accuracy and integrity of the data. It is calculated using a mathematical algorithm based on the other characters in the sequence and is used to detect errors or tampering.

Only the manufacturer and authorized entities 163 may have knowledge of the algorithm and the specific codes assigned to each product. This ensures that the UPC, along with the UID, provides a secure and traceable link between the physical product and its digital record in the authentication database. By combining the UID embedded in the NFC tag with the algorithmically generated UPC, the system achieves a high level of security, making the product effectively unforgeable and significantly increasing the complexity of copying or tampering.

FIG. 1 also shows a third party 163 coupled with network 106. The third party 163 may comprise one or more authorized entities 163 that have knowledge of the algorithm, and the specific codes assigned to each product, or the like.

Figure 2:
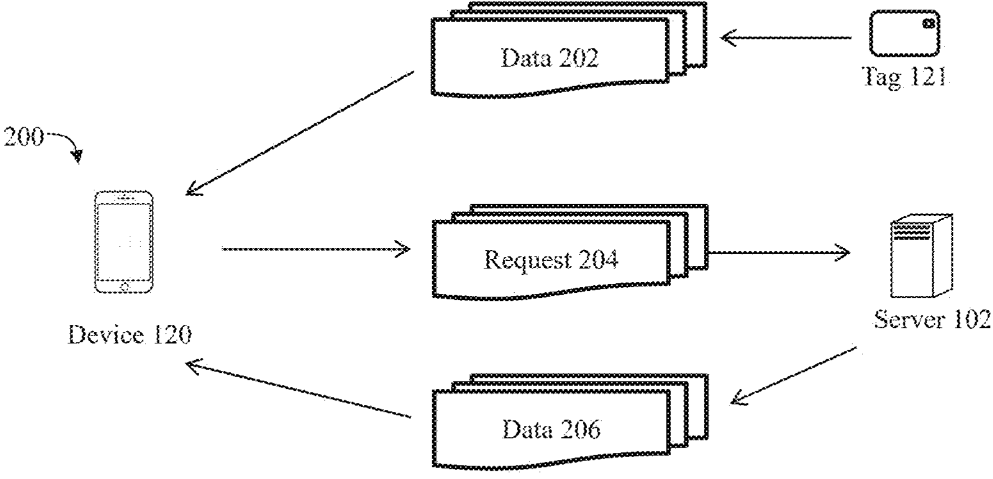
FIG. 2 is a diagram showing the data flow of the process for facilitating authentication of consumer products, according to an example embodiment.

The method and system for verifying the authenticity of a consumer product is described in more detail below, with reference to FIGS. 2-4. FIG. 2 is a diagram showing the data flow 200 of the process for facilitating verifying the authenticity of consumer products, FIG. 3 is a flow chart 300 of a method for the same, and FIG. 4 is a diagram 400 showing the interaction between an NFC tag and a mobile device.

Figure 3:
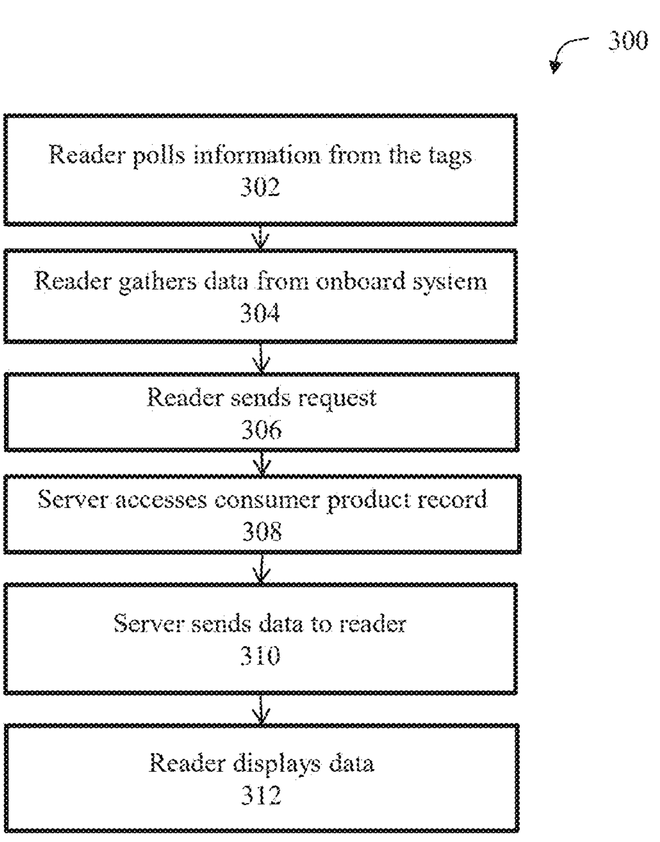
FIG. 3 is a flow chart of a method for authentication of consumer products, according to an example embodiment.
Figure 4:
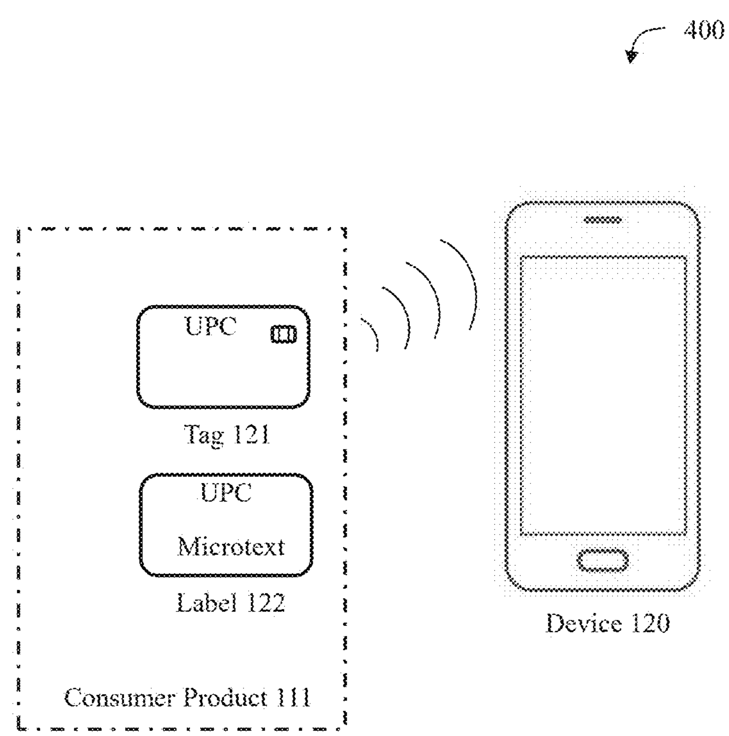
FIG. 4 is a drawing depicting the process of transmitting data from tags on a consumer product to a consumer mobile device, according to an example embodiment.

The process of verifying authenticity of a consumer product 111 begins with step 302 of FIG. 3. In step 302, the reader on device 120 polls information 202 (such as the UID) from the tag 121. For reference, and only as an example, FIG. 4 shows the tags placed in close proximity to the mobile device 120 (also be referred to herein as "reader") to initiate the process of FIG. 3. This process is initiated by the user 110 (or any other party) by either tapping or scanning the tag, depending on which type of tag have been placed on the consumer product 111 or its packaging.

In step 302, in one option, some or all of the data 202 read by device 120 is displayed on device 120. Data 202 may each include, for example, the UID, the consumer product name, a product identifier, a unique identifier, a product description, warranty information, and/or a photo of the product. The data 202 may each include any data that the tag is capable of storing. In another embodiment, the data 202 includes a hash that is produced by the tag 121 wherein encoded in said hash is the UID that identifies the tag itself. The hash may be referred to as an encrypted packet that includes the UID. The data 202 may also include a URL that includes the UID as parameters in the URL.

In step 304, the reader on the device 120 gathers data 202 from the onboard system, and in step 306 the reader sends a request 204 (such as an HTTP request) via the network 106 to the server 102. The data sent in request 204 may include the UID which the server 1020 may use to process the request, authenticate the consumer product, and return the relevant information. The data sent to the server may also include the hash described above, and the UID as parameters in the URL.

Next, in step 308, the server processes and logs the data from the request 204 sent in step 306. The UID sent in the request is used in this step by the server to identify and access the correct product record in database 104 and compare the data 204 to the data in the correct product record. In this step, the server 102 retrieves the UPC in the correct product record that corresponds to the UID it received in step 306. In one embodiment, the server 102 may compare any of the data 204 (that was sent to the server) to data located in a product record (in database 104) that corresponds to the consumer product. If any of the data does not match, then the user is notified in a denial. In another embodiment, the server 102 may also compare the hash in data 204 to the result of a hash algorithm located in the product record that corresponds to the consumer product. If the values do not match, then the user is notified in a denial.

In step 310, the server 102 send the UPC 206 it retrieved to the mobile device 120, which may then display it in step 312. The user 110 may then look at the UPC that is displayed, look at the UPC on the product itself and determine if they match.

In some cases, the UPC retrieved from the server may not match the UPC printed on the NFC tag or the label, indicating a potential authentication issue such as a counterfeit product, a labeling error, or unauthorized tag duplication. To address this, the system includes a graphical user interface that allows the user to report such mismatches. If the user observes a mismatch between the displayed UPC and the printed UPC on the tag and/or the label, the graphical user interface provides an option to report the discrepancy. This can be presented as an interactive button or selectable option labeled "Report Mismatch" or similar. Upon selection, the system prompts the user to confirm the mismatch and may provide additional options, such as selecting a reason for the discrepancy, including incorrect labeling, suspected counterfeit, or damaged NFC tag or label. Once confirmed, the system logs the mismatch event in the server database, associating it with the scanned unique identifier.

Depending on system settings, the mismatch report may flag the product for further investigation by the manufacturer, retailer, or distributor. The system may also trigger an alert to notify authorized entities responsible for quality control or product authentication. In some implementations, the system provides feedback to the user confirming that the mismatch has been recorded and may be reviewed. In cases where multiple mismatch reports are associated with the same unique identifier, the system may restrict further authentication attempts for that product, preventing further fraudulent activity. Additionally, the application may provide guidance to the user on the next steps, such as contacting customer support or scanning a different tag for verification.

The user interface can optionally display marketing information to a user who scans the NFC tag. This marketing information may include, text, images, video links, coupon codes, or promotional offers that are stored within, or referenced by, the product's record in the database. For example, once the server verifies the unique identifier (UID) and retrieves the unique product code (UPC), it may also retrieve associated marketing data such as advertisements, usage instructions, product reviews, or membership program details. This information can then be transmitted back to the user's mobile computing device for real-time display.

When the mobile application receives these marketing assets, it presents them via a user interface configured to handle various media formats. Depending on the brand and product, the interface may show promotional videos, direct users to a product registration or warranty page, provide exclusive digital content, or display discount codes that the user can redeem on the manufacturer's website or at a physical retail location. Further, the marketing information displayed can be tailored according to user location, product history, or seasonal campaigns. If a product is scanned outside its intended sales region, for instance, the server may respond with region-specific disclaimers or alternative promotional messages. Likewise, user feedback about the displayed content can be logged in the database for later analysis.

It should be noted that before the consumer product 111 is purchased, the tag 121 of the product 111 may be scanned or read and activated. In this step, the UID may be logged in the product record corresponding to the UID and the UPC. The inventory and activation process ensures that NFC tags are securely integrated into the authentication system before they can be used for verification. This process begins at the manufacturing or packaging stage, where each NFC tag is initially programmed with a unique identifier that is permanently embedded in its memory. At this stage, the NFC tag remains inactive, meaning it cannot yet be authenticated through the system. The tags are then affixed to consumer products or their packaging in a manner that ensures they cannot be removed or transferred without evidence of tampering. The NFC tags may be attached using industrial-grade adhesives, embedded beneath protective coatings, or incorporated into tamper-evident security labels.

Once the tagged products are transported to a designated inventory location, such as a quality control facility or warehouse, the activation process begins. During inventory processing, each NFC tag is scanned using an authorized NFC reader, which extracts the unique identifier and transmits it to the server over a communications network. The server retrieves the corresponding product record and links the unique identifier to a specific unique product code, ensuring that the NFC tag is now associated with a valid product. At this point, the system changes the tag's status from inactive to active, enabling it to be authenticated when scanned by consumers or retailers. The activation process may also include logging additional metadata, such as the date and location of activation, the batch number, and the identity of the facility performing the activation.

Activation serves several security purposes. By ensuring that NFC tags remain inactive until they pass through an authorized activation step, the system prevents counterfeiters from pre-programming and distributing fraudulent tags. Only tags that have been processed through the activation step can be authenticated by the server, which significantly reduces the risk of unauthorized duplication. Additionally, because activation is linked to an inventory record, the system can track how many units have been activated and identify any discrepancies between expected and actual inventory counts. This allows manufacturers and distributors to monitor their supply chain in real time and detect any irregularities, such as missing or improperly tagged products.

Once activated, NFC tags are ready for consumer use. When a consumer or retailer scans an active tag, the system validates the unique identifier, retrieves the corresponding unique product code, and displays authentication information on the user's device. If an inactive tag is scanned before activation, the system may display an error message or indicate that the tag is unauthorized. This feature enhances product security by ensuring that only properly activated tags can be authenticated, providing a reliable safeguard against counterfeiting and fraud.

Figure 5:
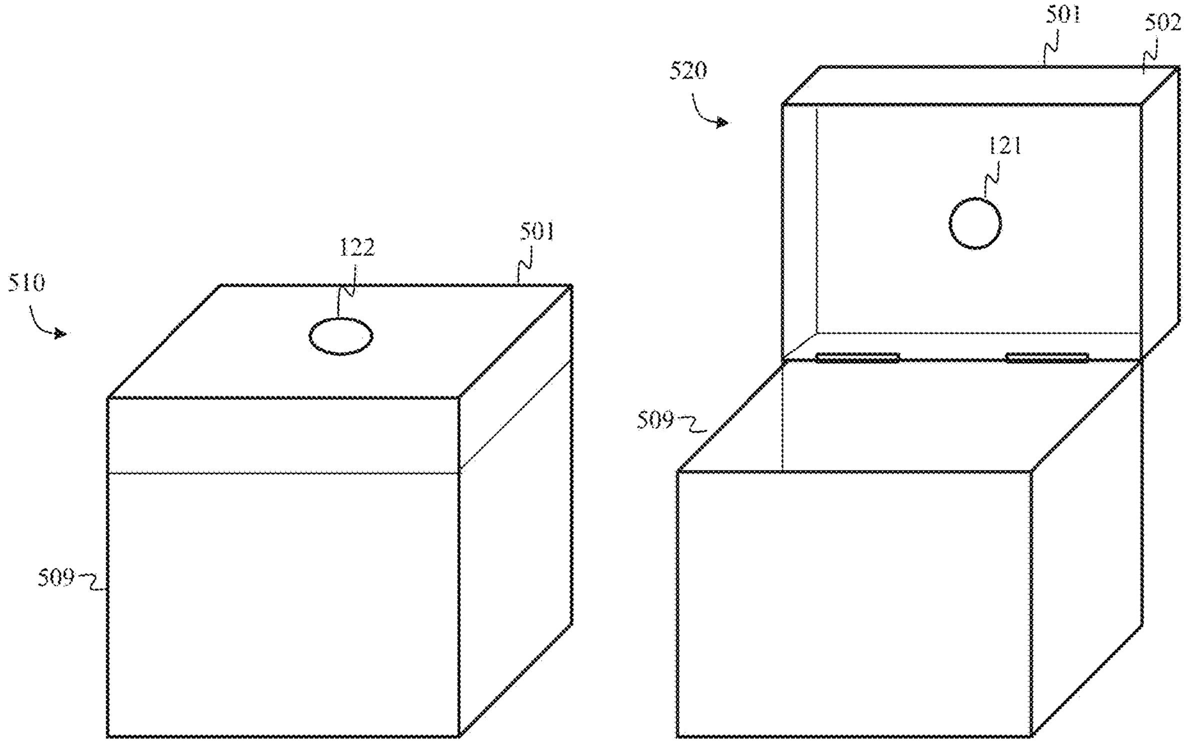
FIG. 5 is a diagram showing the various claimed embodiments used on a consumer product, according to an example embodiment.

FIG. 5 is a diagram showing the various claimed embodiments used on a consumer product 501, according to an example embodiment. FIG. 5 illustrates a consumer product, specifically a cigar box, which incorporates multiple security features designed to authenticate the product and deter counterfeiting. The cigar box, labeled as consumer product 501, features a hinged top door 502 that opens to reveal an enclosure 509. The exterior may be adorned with brand-specific engravings, embossed detailing, or foil stamping. The cigar box 501 is shown in closed orientation 510 and open orientation 520.

An NFC tag 121 is affixed to the interior of the interior of the top door 502 of the cigar box. This tag incorporates multiple security elements. It is constructed from durable adhesive-backed materials, such as polycarbonate or laminated security paper, designed to withstand handling while preserving its legibility. The NFC tag may include a high-resolution printed brand logo applied using techniques like hot foil stamping or UV printing, ensuring durability and resistance to replication. The tag may also include a visible printed representation of a unique product code (UPC), which may consist of a seven-character alphanumeric string generated algorithmically and linked to the NFC tag's unique identifier (UID) stored in the system's database. The NFC tag enables digital authentication by allowing a user to scan it with a mobile computing device.

On the exterior of the top door 502 is a static label 122, otherwise referred to as a physical element. This label is made of tamper-evident materials, such as security paper, polyester film, or metallic holographic material, which are designed to resist removal or transfer without destruction. The static label may include a printed brand logo and a visible printed representation of the unique product code (UPC) identical to the one found on the NFC tag. Unlike the NFC tag, the static label does not contain embedded digital data but serves as a physical confirmation of authenticity. It allows users, inspectors, and retailers to verify the presence of the correct UPC and branding elements without scanning the NFC tag. Additionally, the label 122 may include microtext printed at a scale visible only with magnification tools. This microtext is uniquely generated for each batch of cigar boxes, providing an additional layer of security.

The combination of the NFC tag and the static label provides dual-layer authentication. The NFC tag facilitates electronic verification through database lookup, while the static label offers a visible and tamper-resistant security feature. Together, these features significantly increase the complexity of counterfeiting and ensure that each cigar box can be uniquely identified and authenticated at multiple points throughout the supply chain.

Figure 6:
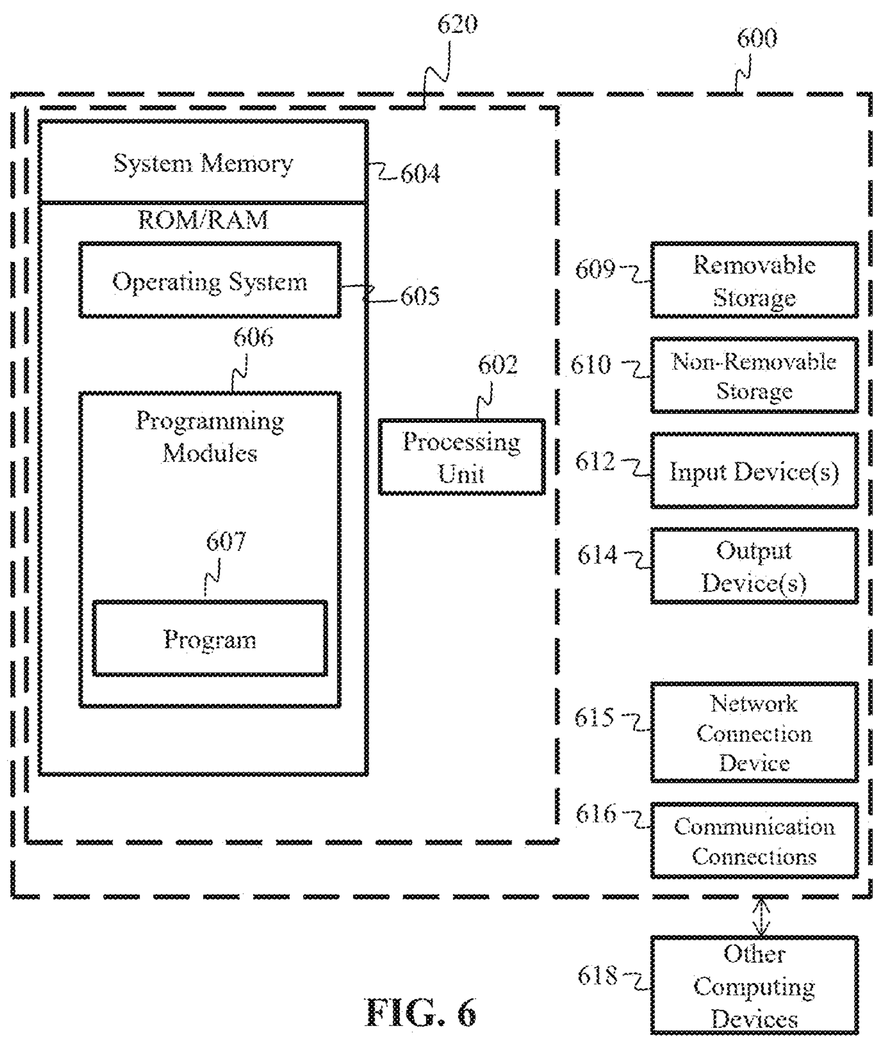
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by device 102, 120, 121, 122, 163 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g., random-access memory (RAM)), non-volatile (e.g., read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of devices 102, 120, 121, 122, 163. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable, and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter, or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g., program module 607) may perform processes including, for example, one or more of the stages of the process 300 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including hand-held devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages, and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for authenticating a consumer product, the method comprising:

coupling a near field communication (NFC) tag to a consumer product wherein the NFC tag includes a hardware-embedded, immutable unique identifier (UID), and wherein the NFC tag is initially configured in an inactive authentication state that prevents successful authentication prior to activation, and wherein said NFC tag includes a printed representation of a unique product code (UPC);

coupling a physical element to the consumer product wherein said physical element includes a visible printed representation of the UPC;

storing in a database, communicatively coupled to a communications network, a record for each of a plurality of consumer products, each record including the UID, the UPC, and an activation status indicating whether the NFC tag has been activated through an authorized inventory or quality-control process;

executing, during an activation process performed by an authorized computing device, an activation operation that transitions the NFC tag from the inactive authentication state to an active authentication state by associating the UID of the NFC tag with the UPC in the database and recording activation metadata;

executing an application on a computing device communicatively coupled to the communications network, wherein said application is configured for reading the UID from the NFC tag, transmitting the UID to a server via the communications network, and receiving authentication data; and wherein the server is configured for:

(i) receiving the UID, via the communications network, from the application;

(ii) determining whether the UID corresponds to an activated NFC tag by verifying the activation status stored in the database;

(iii) denying authentication if the activation status indicates the NFC tag is inactive; and (iv) upon determining the NFC tag is active, accessing the record corresponding to the UID and transmitting the UPC associated with the UID for display, such that a user may determine whether the transmitted UPC matches the printed representation of the UPC on the consumer product via visual inspection.

2. The method of claim 1, wherein said unique product code (UPC) comprises an alphanumeric string generated by an algorithm.

3. The method of claim 2, wherein the physical element contains microtext comprising alphanumeric characters or patterns printed at a scale visible to humans only with magnifying tools.

4. The method of claim 3, wherein said physical element is tamper-proof secured under a protective layer such that removal or alteration of the protective layer would render contents of the physical element unreadable or damaged.

5. The method of claim 4, further comprising the step of presenting the UPC on a user interface, along with an indicator of authenticity.

6. The method of claim 5, further comprising the step of presenting the UPC on the user interface, along with an indicator of authenticity.

7. The method of claim 6, wherein said user interface can display marketing information stored in the database related to the consumer product.

* * * * *